United States Patent Office 3,095,306
Patented June 25, 1963

3,095,306
METHOD OF STABILIZING SPICE MATERIAL AND THE RESULTING PRODUCT
Maclyn R. Peat, Chicago, Ill., assignor to Wm. J. Stange Co., a corporation of Illinois
No Drawing. Filed Apr. 24, 1961, Ser. No. 104,838
15 Claims. (Cl. 99—140)

The invention relates generally to improvements in seasoning products of the type comprising spice extractives carried on soluble substances, such as salt and sugar. In particular, the invention is directed to an improved method and to a preferred composition in which the color, odor and flavor of spice extractives combined with soluble carriers are protected from the deleterious effects of trace metal contaminants and are rendered stable, and in which color fading and the development of rancidity are eliminated or are greatly reduced.

The spice extractives used in the invention include essential oils (usually prepared by steam distillation) and oleoresins (usually obtained by solvent extraction). These materials may not be miscible with the product to be seasoned or flavored or colored. Moreover, only a very small fraction of a percent of a spice extractive is used to season or flavor or color a food preparation and, as a result, it is extremely difficult to disperse the extractive completely and uniformly in the food product.

It has been the practice to realize a more effective and uniform distribution of the active spice, color, or flavor ingredient by incorporating the relatively small amount of the concentrate on a much larger proportion of a carrier material. Soluble carriers, such as salt, sugar, and dextrose have been used, as described in United States Patent No. 2,134,380 and United States Patent No. 2,170,954. And, in addition, as described in United States Patent No. 2,925,344, finely divided water-insoluble carriers, such as calcium silicate, magnesium carbonate, and cellulose, have proved particularly suitable as distributing and dispersing agents. When the spice extractive is combined with a soluble carrier material such as salt or sugar, the resulting product is commonly referred to as a "soluble seasoning." It is with improving the stability of these soluble seasonings that the present invention is principally concerned.

It has long been known that the essential oils and oleoresin extractives of spice materials are susceptible and subject to oxidative rancidity and that both flavor and color deteriorate appreciably unless special agents such as chemical antioxidants are added to the extractives. Nordihydroguaiaretic acid (beta, gamma-dimethyl, alpha delta-bis(3,4-dihydroxyphenyl)butane) has been found particularly suitable as an antioxidant for preventing the development of rancidity and for preservation of the natural color in the extractives prepared from spice materials. Other commercially available fat-soluble antioxidants or antioxidant mixtures such as butylated ethoxyphenol, butylated hydroxyanisole (B.H.A.), butylated hydroxy toluene (B.H.T.), propyl gallate, or propyl gallate-citric acid mixture, or the like, singly or in mixtures, may be used.

The addition of antioxidants has often proven remarkably effective in improving the stability of the color, and flavor, and odor, and to deter the development of rancidity in the essential oils and in oleoresinous spice extractives themselves, that is, when they are stored as concentrates without incorporation on carrier materials. However, when the extract concentrates are deposited on solid carrier materials, and particularly when soluble carriers such as salt and sugar are used, the effectiveness of antioxidants to prevent deteriorative changes in the spice extractives is greatly reduced. And spice extractives, when combined with soluble carriers, are susceptible to such rapid color loss, taste loss and general deterioration that the commercial practicability and usefulness of such products has been seriously limited. It is to the solution of this instability problem that the present invention is directed.

It is postulated herein that the increase in the rate of deterioration of the spice extractives is due to the action of contaminants comprising metallic salts or trace metals such as copper, iron, and nickel, etc. These trace metals, which have a known pronounced effect in catalyzing the oxidative deterioration of other materials such as oils and edible fats, are believed to have a similar deleterious effect on spice concentrates or extractives.

It is thus a principal object of this invention to provide a method and a preferred formulation which may be used to improve the stability of oleoresinous spice concentrates or extratives carried on particulate solid carriers, and especially on carriers of the soluble type.

Another object of the present invention is to provide an improved method of sequestering or inactivating heavy metals such as iron, copper, nickel, and others, which may be present as contaminants in certain edible substances which are useful as carriers for the oleoresins, extractives or other spice concentrates.

Still another object of the present invention is to provide an improved combination of chemical agents for preserving the color, taste, and aroma of spice extractives which may themselves contain trace metal contaminants which catalyze the oxidative deterioration of such extractives.

Other objects, advantages and features of the invention will become apparent from the following detailed description considered in conjunction with the data recorded in the tables forming a part of this disclosure.

Proceeding on the theory that the acceleration in the development of oxidative rancidity, and the acceleration of color, flavor, and aroma deterioration which occur when soluble carriers such as salt are used in combination with spice extractives are due to trace metal contaminants in the carrier itself, a solution to the problem was sought in research in the area of metal complexing agents, or metal deactivators, or chelating agents. Several unexpected and surprising discoveries were made in the course of this research and it is these discoveries which are the substances of the present invention.

In accordance with the teachings of this invention, a preferred procedure is the following: A carrier material, such as salt or sugar, is treated with a special metal chelating or sequestering agent. The spice extractive (oleoresin or essential oil, etc.) is treated separately with an antioxidant preparation. And then the spice extractive and the carrier material are combined to form a stabilized and "protected" soluble seasoning.

In a preferred embodiment of the invention, the carrier material is treated with a metal deactivator or metal sequestering agent comprising the calcium chelate of the disodium salt of ethylene diamine tetraacetic acid. The treated carrier is then combined with an antioxidant-treated spice extractive. The resulting product is resistant to color loss and to oxidative deterioration caused by metal-catalyzed reactions. The metal complexing or metal sequestering agent is added directly to the carrier material itself rather than to the spice extractive or to the final combined product. This procedure ensures the most effective and complete association between the complexing agent and the trace metal contaminants in the carrier.

A representative example of a specific embodiment of the invention relates to a method of stabilizing the oleoresin of paprika against oxidative deterioration and color loss catalyzed by a metal or metal salt. The method comprises treating the salt carrier, on which the oleoresin is to be incorporated, with from about 0.001% to about 0.05% by weight (based on the weight of carrier) of the calcium chelate of the disodium salt of ethylene diamine tetraacetic acid, the oleoresin itself having incorporated therein an antioxidant in an amount ranging from about 0.001% to about 2.0% by weight, based on the weight of oleoresin. Based on the weight of the salt-carried oleoresin product, the antioxidant concentration would be from about 0.1 p.p.m. to about 1000 p.p.m., depending upon the concentration of oleoresin in the seasoning and upon the concentration of antioxidant in the oleoresin. The chelating agents of this invention are also useful in preventing loss of color, and impairment of taste and aroma in spice extractives not combined with carriers, but which do themselves contain trace metals such as iron, copper, and nickel.

In the preferred embodiments of this invention, the antioxidant is added to the oleoresin as a concentrate which contains from about 15% to about 50% of antioxidant. It is apparent that more dilute solutions could be used and also that one might in certain circumstances prefer to add a 100% active antioxidant product.

Many known metal complexing agents or chelating agents were investigated. These were tested at various concentrations, both alone and in combination with antioxidants. In some instances, where solubility characteristics permitted, the chelating agents were added directly to the spice extractives or combined with the antioxidants; in other experiments, the chelating or sequestering agents were added directly to the carrier salt before combining the extractive and the carrier. The effectiveness of any particular combination of variables was measured in a series of experiments in which 3 to 5 parts of oleoresin of paprika were blended with about 95 parts of salt. It having been established that a direct relationship exists between the loss of color of the paprika oleoresin, on the one hand, and the development of oxidative rancidity and the decline of general acceptability of the spice product, on the other hand, the extent of deterioration of the oleoresin carried on the salt was followed and measured as a function of the loss of color of a standardized preparation. The color standardization procedure employed is described below:

COLOR STANDARDIZATION PROCEDURE

The color standardization procedure for oleoresin paprika was carried out by comparing a known dilution of the oleoresin with the color of a standard consisting of an arbitrary but useful and reproducible color standard solution containing potassium dichromate and cobaltous chloride. The solutions used in making the reference color standard were the following:

A. 0.1 N potassium dichromate:
 Dissolve 4.904 grams $K_2Cr_2O_7$ in distilled water and make up to a volume of 1 liter.
B. 0.5 N cobaltous chloride:
 Dissolve 5.948 grams $CoCl_2 \cdot 6H_2O$ in distilled water and make up to a volume of 1 liter.

The color standard was prepared by combining 5 cc. of solution A with 0.5 cc. of solution B and diluting the resulting mixture to 50 cc. with distilled water. This procedure was carried out conveniently in a 50 ml. Nessler tube.

The color value, C.V., of an oleoresin of paprika preparation is then defined as 100 times the number of cc. of solvent which must be added to 1 cc. of a 1% solution of the preparation to be tested, in a calculated 50 ml. final total volume, to match the color of the standard preparation described above.

A standard transmittance curve was plotted by preparing a series of oleoresin dilutions of a known color value. The transmittance was plotted, at a selected wave length, e.g. at 465 m$\mu$, as a function of the calculated color value. The resulting curve was used in determining the color value of any experimental solution obtained in the course of study of the color fading of oleoresin preparations.

Oleoresin of paprika standardized to a color value of 40,000 was used in the experimental program outlined and summarized below. Five parts of this oleoresin was blended with 95 parts of salt. As indicated, in each case, various antioxidants were added to the oleoresin and various metal complexing or chelating agents were added to the salt. Control experiments in which neither antioxidants nor chelating agents were used were conducted along with the general experimental program. In other control or reference experiments, antioxidants were used without chelating agents; and, in still other controls, chelating agents were used without antioxidants.

It was found that, in general, better results were obtained when the sequestering, chelating, or metal complexing agent was added directly to the salt rather than to the oleoresin, and, with one exception, in the work reported below the sequestering agent was blended into the salt prior to combining the salt and the oleoresin. In some instances, alternative procedures were obviated because of the insolubility of the particular chelating or sequestering agent in the oleoresinous material. Except where otherwise indicated, 0.25 ml. of the particular sequestering agent solution was blended into 95 grams of the carrier salt. The concentration of sequestering or complexing agent used in the work reported is in the range of about 0.002% to about 0.025% (20 to 250 p.p.m.) based on the salt carrier. Higher concentrations may be used if desired, and lower concentrations will give satisfactory results under some conditions. Although the concentrations of sequestering agent referred to above would normally be sufficient to complex heavy metals ordinarily present in the salt carrier, it is possible that in preparative steps of grinding, milling, mixing and preparing the seasonings, the final metal content may become considerably higher than that originally present in the salt. In such cases, it is apparent that greater concentrations of sequestering agents would be needed and concentrations of as much as 0.1% or more could be indicated. The compositions and the concentrations of each of the sequestering or chelating solutions are given in Examples E through K.

The exception to the general procedure described above is the case in which stearyl acid phosphate was used as the sequestering agent. Here, following the manufacturer's general suggestions and recommendations for the use of this material, 0.05% of stearyl acid phosphate solution was added directly to the oleoresin before combining the oleoresin with the salt. (The stearyl acid phosphate solution itself consisted of 5 grams of stearyl acid phosphate per 100 cc. of corn oil.)

The course of reaction in each system, that is, the rate of deterioration of the salt-carried oleoresin, was followed by periodic determination of the color retained by or remaining in the product. Aliquots of the sample were removed from time to time and the residual color ascertained by solvent extractions and colorimetric analyses. The percent color loss, based on the original standardized color value, was taken as the measure of the extent of deterioration of the spice extract. In the experiments summarized below, data are given for test periods of 5 days, 10 days, and 15 days.

The research reported herein relates principally to work with the oleoresin of paprika. However, similar and comparable results were obtained in parallel research using the oleoresin of capsicum. Consistent results were obtained in scattered experiments in which still other spice extractives, such as oleoresin marjoram and oleoresin basil, were used.

There are many chemical compounds which have been shown to have metal chelating ability, and there are still more compounds for which such chelating, sequestering, or complexing ability has been claimed. On the theory that the development of oxidative rancidity in soluble seasonings (spice extractives carried on soluble carriers, such as salt and sugar) is catalyzed by trace metals, such as iron, nickel, and copper in the carrier material, one might reasonably conclude that any chelating agent or sequestering agent with the demonstrated ability of complexing iron, nickel, and copper would prove effective to deactivate these (and other) trace metals in the soluble carriers. As a result, one would reasonably expect that any and all of these chelating or complexing agents would be about equally useful for preventing deterioration of spice extractives combined with or carried on soluble carriers. Such, however, is not the case. And, in fact, almost without exception, chelating agents have proven of little utility for this particular and special purpose, even though in other, perhaps less complex, systems they may have useful and widespread applications. Heretofore, it has not been possible to stabilize the color of spice extractives combined with soluble carriers.

The present invention deals with the discovery of a family of chelating agents, and more exactly with a preferred specific chelating agent, which is unique in that it is markedly and extraordinarily effective, when used in accordance with the teaching of this invention, in deterring oxidative rancidity and loss of color in soluble seasonings. The sequestering or chelating agent is the disodium salt of the calcium chelate of ethylene diamine tetraacetic acid, dihydrate ($C_{10}H_{12}O_8N_2CaNa_2 \cdot 2H_2O$) or calcium disodium EDTA, CaNa$_2$ EDTA. Other soluble salts of ethylene diamine tetraacetic acid are also effective, but for several reasons, as will become apparent, the calcium chelate is preferred.

The unique suitability of these salts, and particularly of calcium disodium EDTA for the application described, is brought out graphically in the experimental data which appear in the tests summarized in the tables below.

A very important factor which must be considered in connection with the use of chemical additives in preparations which are used in foods or in food products is the question of compliance with the provisions of the Federal Food, Drug and Cosmetic Act. The Dow Chemical Company's Versene CA (Dow's brand of calcium disodium EDTA) has been cleared and approved for use as a "preservative in sandwich spread, nonstandardized dressings and sauces, and as an antigushing ingredient in fermented malt beverages." Recently, approval has been extended to include some standardized food products. The metal complexing or chelating agent which finds utility in the present invention must be non-toxic and must impart no undesired color, odor or taste to the material with which it is combined. Calcium disodium EDTA satisfies all of these requirements.

The chelating or sequestering compounds of the present invention serve to deactivate and ineffectuate the catalytic effect of metals and may thus be referred to as metal deactivators. They are effective to "deactivate" the objectional trace metals, such as copper, iron and nickel, et al., which are normally present in trace quantities in common salt, and in other carrier materials. Concentrations of up to about 2 p.p.m. of copper and 2 p.p.m. of iron are not uncommon in food grade sodium chloride. These low concentrations, though ordinarily and for most purposes unobjectionable, are sufficient to catalyze and greatly accelerate the process of oxidative rancidity in fats, in oils, and in related substances including spice extractives. It has been found that a concentration of about 30 p.p.m. (based on the soluble carrier) of the chelating compound of this invention, used in accordance with the practice of this invention, is ordinarily effective to complex the trace metals normally present in food grade salt; and in the work recorded herein, about 25–100 p.p.m. has proved a practical range.

The metal deactivators or metal chelating agents may be distinguished from other additives generally added to fatty or fat-containing materials for various purposes. For example, antioxidants are added to edible fats, oils, and similar substances to retard the development of rancidity therein. These antioxidants fulfill the role of controlling the formation of free radicals which are the active agents in instigating the rancidity chain reaction. The antioxidants will not suppress the catalytic effect of metals in accelerating the deterioration of edible fats, oils, and related substances; and the metal deactivators will not substantially suppress rancidity development except to the extent that such rancidity may result from the catalytic effect of trace metals.

It is suggested by the theories postulated above, and supported by authorities in the relevant fields, and it has also been found that for many practical applications, best results are obtained when antioxidants are used in conjunction with the chelating or metal-complexing agents. In some systems, antioxidants are believed to exhibit a synergistic effect when used in conjunction with chelating agents, or conversely, chelating agents may be considered to be synergistic with respect to the activity of antioxidants.

The selection of a particular antioxidant or mixture of antioxidants is not a critical consideration in the present invention. It has been found, however, that certain combinations give better results than others. A preferred antioxidant preparation has the following composition:

*Example A*

ANTIOXIDANT NO. 1 (AO-1)

| | Percent |
|---|---|
| Nordihydroguaiaretic acid (N.D.G.A.) [1] | 4 |
| Butylated hydroxy anisole (B.H.A.) | 40 |
| Citric acid | 2 |
| Atmos 300 [2] | 20 |
| Propylene glycol | 34 |

[1] Wm. J. Stange brand of nordihydroguaiaretic acid.
[2] Atlas Powder Co. brand of mono- and di-glycerides.

Another antioxidant preparation which has been found useful in the practice of the invention is the following composition having the same ingredients as above but in different relative proportions:

*Example B*

ANTIOXIDANT NO. 2 (AO-2)

| | Percent |
|---|---|
| Nordihydroguaiaretic acid | 10 |
| Butylated hydroxy anisole | 20 |
| Citric acid | 6 |
| Atmos 300 | 44 |
| Propylene glycol | 20 |

It will be observed that antioxidant compositions No. 1 and No. 2 above each includes, as a component, citric acid which is a known metal chelating agent.

In addition to the mixtures of antioxidants, specified above, solutions of nordihydroguaiaretic acid and of butylated hydroxy anisole in mixtures of mono- and di-glycerides were investigated. Typical formulations are antioxidant preparations No. 3 and No. 4 below:

Example C
ANTIOXIDANT NO. 3 (AO-3)

| | Percent |
|---|---|
| Nordihydroguaiaretic acid (N.D.G.A.) | 16 |
| Atmos 300 (mono- and di-glycerides) | 84 |

Example D
ANTIOXIDANT NO. 4 (AO-4)

| | Percent |
|---|---|
| Butylated hydroxy anisole (B.H.A.) | 40 |
| Atmos 300 (mono- and di-glycerides) | 60 |

In the experiments carried out and summarized in Table 1, the antioxidants were used by adding 1% to 3% of the antioxidants solution to the oleoresin. The total antioxidant content of the prepared antioxidant solutions (see Examples A through D) varies from about 15% to about 50%. As indicated above, and as shown in Table 1, the use of antioxidants alone (without a metal chelating agent) has some retarding effect on the fading of the color of oleoresins, such as paprika and capsicum carried on a salt base. Whereas the control, having no antioxidant and no chelating or sequestering agent, suffers complete loss of color and becomes rancid within two days, the incorporation of either the antioxidant No. 1 composition or the antioxidant No. 2 composition gives definite improvements, as shown in Table 1, although more than two-thirds of the original color is lost at the end of about two weeks. In the following tables, the suffix "P" after the number of a test or of an experiment indicates an oleoresin paprika experiment; the suffix "C" indicates an oleoresin capsicum experiment. The letters AO refer to "antioxidant," and the letters SA referred to "sequestering agent."

TABLE 1
[Effect of antioxidant on color retention in absence of sequestering agents (Oleoresin paprika)]

| Test No. | Antioxidant Composition | Sequestering or Chelating Agent | Color Loss (Percent) | | |
|---|---|---|---|---|---|
| | | | After 5 days | After 10 Days | After 15 Days |
| 1P (Control) | None | None | [1] 100 | | |
| 2P | AO-1 | do | 11 | 30 | 65 |
| 19P | AO-1 | do | 7 | 43 | 68 |
| 23P | AO-1 | do | 6 | 40 | 73 |
| 3P | AO-1 | do | 12 | 33 | 69 |

[1] Completely faded and rancid within 2 days.

The remarkable ability of calcium disodium EDTA to deter the deterioration of color and of aroma and taste in salt-carried oleoresin of paprika was first indicated in exploratory experiments carried out as a part of a general research program. This program was aimed at improving the overall quality and the shelf-life of soluble seasonings and of commercial products in which spice extractives play a major role. In order to establish a basis of comparison by which to evaluate the calcium disodium EDTA properly, a series of experiments was carried out in which the effect of that chemical agent could be compared with other chelating agents in the system: spice extractive-salt carrier. Among the reference chelating agents or sequestering agents used were citric acid (at several concentrations), stearyl acid phosphate, disodium acid phosphate, and the disodium salt of ethylene diamine tetraacetic acid. The various formulations used are tabulated in the Examples E through K below:

Example E
SEQUESTERING AGENT SOLUTION C-3 (SA-C3)

Citric acid _____ grams/100 cc__ 3

Example F
SEQUESTERING AGENT SOLUTION C-10 (SA-C10)

Citric acid _____ grams/100 cc__ 10

Example G
SEQUESTERING AGENT SOLUTION C-33 (SA-C33)

Citric acid _____ grams/100 cc__ 33

The effectiveness of citric acid as a chelating agent in oleoresins in the presence of antioxidants was studied in a series of experiments in which three concentrations of citric acid were used with one antioxidant preparation, and in which a single concentration of citric acid was used with three different antioxidant preparations. The citric acid concentrations were 0.008%, 0.025%, and 0.075% based on the salt used; and the oleoresin was 5%. In each case, 0.25 gram of the sequestering agent solution was blended with 95 grams of salt prior to the blending of the oleoresin into the salt. The antioxidant was incorporated into the oleoresin before blending the oleoresin with the salt carrier. The oleoresin, containing the antioxidant, was blended with the salt in a ratio of 5 grams of oleoresin per 95 grams of salt.

TABLE 2
[Concentration effect of citric acid sequestering agent on color retention (oleoresin paprika)]

| Test No. | Antioxidant Composition | Sequestering or Chelating Agent | Color Loss (Percent) | | |
|---|---|---|---|---|---|
| | | | After 5 days | After 10 Days | After 15 Days |
| 11P | AO-1 | SA-C 3 | 19 | 74 | 100 |
| 12P | AO-1 | SA-C 10 | 17 | 40 | 65 |
| 8P | AO-1 | SA-C 33 | 31 | 50 | 66 |
| 6P | AO-3 | SA-C 33 | 29 | 48 | 72 |
| 9P | AO-4 | SA-C 33 | 37 | 67 | 70 |

It will be observed that the low 3% solution (test 11P) of citric acid produced a final system somewhat less stable than the other systems. Increase from a 10% solution (test 12P) to a 33% solution of citric acid (test 8P) yielded no further apparent benefits, that is, no appreciable improvement over the 10% solution. Attention is directed to the fact that the antioxidant AO-1 includes 2% of citric acid. Since the antioxidant is used at a concentration of about 1% to 3% of a 10% solution, based on the oleoresin, this additional citric acid amounts to an additional 0.01% based on the salt carrier used.

A comparison of 15-day color loss, in Tables 1 and 2, indicates that the addition of citric acid has little, if any, beneficial effect on color retention in the spice extractives system under investigation. This may be because the citric acid merely duplicates the effect of the antioxidant compositions, or, on the other hand, it may be that citric acid is actually inactive as a chelating agent in the particular experimental environment involved. There are many unknown factors which affect the rate of reaction of natural products, such as spice extractives, with chemical agents, and it is, therefore, not possible to be certain that all variables are controlled completely at all times. Thus it becomes impractical to compare one series of experiments directly with another run conducted at a different time, even though presumably under the same "controlled" conditions. As a result, one must, in general, rely upon base reference or "control" experiments carried out with each phase of the overall project.

All of the antioxidant solutions used in the research program were evaluated and compared with one another in two groups of experiments in each of which a single sequestering agent was used (a 33% solution of citric acid (C-33) in one series, and stearyl acid phosphate (SAP) in the other series). In the citric acid experiments, 0.25 gram (0.075% (citric acid) based on salt carrier) of the sequestering solution (C-33) was blended with 95 grams of salt prior to the blending of the oleoresin with the salt. In the stearyl acid phosphate (SAP) experiments, 0.05% of the sequestering agent (in corn oil) was added directly to the oleoresin paprika prior to adding the oleoresin to the salt base (Example K). In all cases, the antioxidant was incorporated directly into the oleoresin before combining the oleoresin with the salt carrier. The concentration of oleoresin paprika used in each experiment was 5 grams of oleoresin per 95 grams of salt. The results of the tests appear in Table 3.

TABLE 3

[Comparative effects of antioxidants in the presence of sequestering agents (oleoresin paprika)]

| Test No. | Antioxidant Composition | Sequestering or Chelating Agent | Color Loss (Percent) | | |
|---|---|---|---|---|---|
| | | | After 5 days | After 10 Days | After 15 Days |
| 8P | AO-1 | SA-C 33 | 31 | 50 | 66 |
| 7P | AO-2 | SA-C 33 | 37 | 64 | 92 |
| 6P | AO-3 | SA-C 33 | 29 | 48 | 72 |
| 9P | AO-4 | SA-C 33 | 37 | 67 | 70 |
| 16P | AO-1 | SA-SAP | 26 | 43 | 69 |
| 17P | AO-2 | SA-SAP | 29 | 39 | 74 |
| 18P | AO-3 | SA-SAP | 28 | 38 | 71 |

The results indicate that, based on the 15-day time period, when used in combination with citric acid as the chelating agent, the antioxidant No. 1 (AO–1) composition may be somewhat better than the others tested, and that the antioxidant No. 2 (AO–2) is perhaps poorer than the rest of the group, at least as measured at the end of a 2-week period. In the series of tests using stearyl acid phosphate (SAP) as the sequestering agent, the results were about the same for each of the antioxidants used, none giving significantly better stability than the others. The stearyl acid phosphate (SAP) series was about equal to the citric acid series in this part of the research program. None of the combinations shown in Table 3 gave commercially acceptable products, there being about 30% color loss after only 5 days.

Similar experiments were conducted using the sequestering agents of Examples H, I, J and K, tabulated below:

*Example H*

SEQUESTERING AGENT SOLUTION DAP (SA–DAP)

Disodium acid phosphate _____grams/100 cc__ 10

*Example I*

SEQUESTERING AGENT SOLUTION Na₂EDTA (SA–Na₂ EDTA)

Disodium salt of ethylene diamine tetraacetic acid
  grams/100 cc__ 9

*Example J*

SEQUESTERING AGENT SOLUTION CaNa₂EDTA SA–CaNa₂ EDTA)

Disodium salt of the calcium chelate of ethylene diamine tetraacetic acid _____grams/100 cc__ 9

*Example K*

SEQUESTERING AGENT SOLUTION SAP (SA–SAP)

Stearyl acid phosphate _____ 5 grams/100 cc. of corn oil.

1 cc. of the above solution, 0.05% (based on SAP), was added to the oleoresin prior to combining the oleoresin with the salt base.

The effectiveness of the disodium acid phosphate and the disodium salt of ethylene diamine tetraacetic acid as compared with the citric acid sequestering agent and the stearyl acid phosphate sequestrant may be seen in Table 4. In each experiment recorded, the antioxidant solution used was either the antioxidant No. 1 (AO–1) composition or the antioxidant No. 3 (AO–3) composition. As shown in tests number 6P and numbers 8P and 16P and 18P in Table 3, these antioxidant preparations have essentially equivalent effects, at least when used with the citric acid chelating or sequestering agents or with stearyl acid phosphate.)

TABLE 4

[Comparative effects of chelating agents used in combination with antioxidants]

| Test No. | Antioxidant Composition | Sequestering or Chelating Agent | Color Loss (Percent) | | |
|---|---|---|---|---|---|
| | | | After 5 Days | After 10 Days | After 15 Days |
| 12P | AO-1 | SA-C 10 | 17 | 40 | 65 |
| 13P | AO-3 | SA-DAP | 5.4 | 47 | 83 |
| 15P | AO-3 | SA-Na₂EDTA | 5.2 | 8.2 | 9.5 |
| 10P | AO-1 | SA-CaNa₂EDTA | 0 | 0 | 5.7 |
| 14P | AO-3 | SA-CaNa₂EDTA | 1.2 | 7.4 | 9.3 |
| 16P | AO-1 | SA-SAP | 26 | 43 | 69 |
| 18P | AO-3 | SA-SAP | 28 | 38 | 71 |
| 8P | AO-3 | SA-C 33 | 31 | 50 | 66 |
| 6P | AO-1 | SA-C 33 | 29 | 48 | 72 |

A surprising fact, which is brought out most clearly by the results recorded in Table 4, is that the calcium chelate of the disodium salt of ethylene diamine tetraacetic acid and the disodium EDTA (tests 10P, 14P and 15P) are markedly superior to all other metal complexing agents tested. In fact, the difference exhibited is one of kind rather than merely of degree. Only the salt of EDTA and the calcium chelated salt yield results which are suitable for and make commercial exploitation possible. For reasons already indicated, the calcium chelate product is preferred.

It has been pointed out above, and it is shown in Table 1, that the use of antioxidant compositions, without the concurrent use of sequestering or chelating agents, gives definite improvement in the color retention of spice extractives, such as oleoresin of paprika and oleoresin of capsicum on salt carriers. A group of paralleling experiments was carried out to determine the effect of chelating or sequestering agents in the absence of antioxidants. In these experiments 0.25 gram of sequestering agent solution was blended with 95 grams of salt prior to adding the oleoresin to the salt. The oleoresin was blended with the treated salt at a ratio of 5 grams of oleoresin to 95 grams of salt. The rate of color loss was determined as a function of time. The results obtained for oleoresin paprika are shown in Table 5.

TABLE 5

[Effect of sequestering agent on color retention of oleoresin paprika in absence of antioxidants]

| Test No. | Antioxidant Composition | Sequestering or Chelating Agent | Color Loss (Percent) | | |
|---|---|---|---|---|---|
| | | | After 5 Days | After 10 Days | After 15 Days |
| 1P (Control) | None | None | ¹ 100 | | |
| 4P | do | SA-C 10 | 15 | 47 | 87 |
| 5P | do | SA-CaNa₂EDTA | 12 | 38 | 62 |

¹ Completely faded and rancid within 2 days.

It is apparent that there is significant improvement in color retention (and in the retention of the other desirable properties, such as taste and aroma, which seem to parallel color retention) of spice extractives carried on salt when the salt has been pretreated with a sequestering or chelating agent, even though no antioxidant has been added to the spice concentrate. For example, the salt-carried oleoresin paprika became rancid and lost all of its color within two days when neither antioxidant nor chelating agent was used. (In a related "control" experiment (Table 6, test 31C), red pepper or capsium oleoresin was used instead of oleoresin paprika. When neither antioxidant nor sequestering agent was used, 97% of the color was lost in five days.) Pretreating the salt carrier with a sequestering agent results in significant improvements in product stability (see tests 4P and 5P). A comparison with the results recorded in Table 1 will show that the effect of chelating agents used alone is about the same as the effect of antioxidants used alone. The calcium chelate of the disodium salt of EDTA, used alone, is somewhat more effective than the citric acid, used alone.

As pointed out earlier, the individual effects of the antioxidants and the chelating or sequestering agents are not additive or cumulative. That is, when both types of materials are used in the same reference system, the results realized are, in general, little better and ordinarily about the same as if only one or the other type of chemical agent had been used. (Compare tests 2P and 3P with essentially no sequestering agent present, and tests 4P and 5P, having no antioxidant, with tests 12P, 8P, 16P and 17P in which both sequestering agents and antioxidants were used.)

In addition to the extensive research carried out with the oleoresin paprika, and reported hereinabove, a less exhaustive series of parallel experiments was carried out using red pepper (capsicum) oleoresin. Several sequestering agent solutions were tested in the presence of an antioxidant. The antioxidant used was the preferred preparation described as antioxidant solution No. 1 (see Example A). The purpose of these tests was to ascertain whether the surprising, unexpected and unpredicted superiority of the soluble salts, and particularly of the calcium chelate salt of ethylene diamine tetraacetic acid in preventing the loss of color and the development of rancidity in the oleoresin paprika, could also be found with other spice oleoresins. As in the other experiments, the effectiveness of each chemical system was measured by following the rate of loss of color of a standardized oleoresin (capsicum) blend. The blend used had a color value of 15,000 units.

The experimental results obtained in the oleoresin capsicum investigation are shown in Table 6. In all, except test 31C, salt was treated with the designated sequestering agent composition, and then antioxidant-treated oleoresin capsicum was blended onto the salt. In practice, 97 parts of salt, treated with about 15 p.p.m. to about 850 p.p.m. of sequestering agent (0.25 gram of the sequestering agent solution), was blended with 3 parts of oleoresin capsicum previously treated with 1% to 3% of the antioxidant solution (AO-1, Example A). The development of rancidity and the general oxidative deterioration of the spice material were measured by the determination of the percent of color loss after periods of 5, 10 and 15 days. The results obtained, using four different sequestering agent systems, are summarized in Table 6. The data obtained indicate that, for the two different citric acid concentrations (tests 32C and 33C) used with the antioxidant solution No. 1 (AO-1) (test 34C), from about 70% to about 90% of the original color of the capsicum is lost after a two-week period. Only with the calcium chelate of the disodium salt of ethylene diamine tetraacetic acid is good stabiltiy realized, and in this system only about 6% of the original color is lost in the same two-week period (test 35C). In a control or reference experiment, in which neither an antioxidant nor a sequestering or chelating agent was used, 97% of the original capsicum color was lost in 5 days (test 31C). Tests carried out with other spice concentrates, including those of marjoram and basil established that, in these cases also, the use of the calcium chelate of the sodium salt of EDTA is effective in delaying the oxidation of the oleoresin preparations.

TABLE 6

[Composition effects of sequestering agents on color retention of oleoresin capsicum (in presence of an antioxidant)]

| Test No. | Antioxidant Composition | Sequestering or Chelating Agent | Color Loss (Percent) | | |
|---|---|---|---|---|---|
| | | | After 5 Days | After 10 Days | After 15 Days |
| 31C (Control) | None | None | 97 | 100 | |
| 32C | AO-1 | SA-C 10 | 18 | 52 | 69 |
| 33C | AO-1 | SA-C 33 | 29 | 53 | 87 |
| 34C | AO-1 | SA-DAP | 12 | 40 | 81 |
| 35C | AO-1 | SA-CaNa$_2$EDTA | 0.7 | 3.4 | 6.2 |

It has been pointed out that the quantity of chelating or sequestering agent necessary to deter effectively oxidative discoloration and oxidative rancidity is a function of the concentration of heavy metals, such as iron, copper and nickel present in the spice concentrate composition. For the most part, the work described in the foregoing disclosure was carried out using chelating compounds at a concentration of about 225 p.p.m. (0.0225%), based on the weight of soluble carrier. This is a concentration considerably in excess of the sequestering agent requirement calculated on the basis of the iron and copper ordinarily present in food grade salt, the principal soluble carrier used in the research reported herein.

Under the presently propounded theory of chelation, to sequester 1 part by weight of iron, there would be required about 7 parts by weight of a chelating agent, such as the calcium chelate of the disodium salt of EDTA. Thus, for the 2 to 3 parts per million of iron and copper ordinarily present in food grade salt, about 15 to 25 parts per million of chelating agent would be the theoretically required minimum. In practice, the concentration required may be somewhat greater than the calculated theoretical minimum.

The effect of sequestering agent concentration in salt-carried spice oleoresins was studied in a series of experiments in all of which the same antioxidant preparation was used. Oleoresin paprika was treated with 2% by weight of antioxidant solution No. 1 (AO-1). Five parts by weight of the antioxidant-containing oleoresin was blended with 95 parts by weight of salt. In the experiments, summarized in Table 7, the salt had been treated with a range of different concentrations of the calcium chelate of the disodium salt of EDTA. As reference control experiments, tests 19P and 23P were carried out using no sequestering agent. The results obtained indicate that in the absence of any of the chelating agent of the preferred embodiment of this invention the spice concentrate lost about 6% of its original color in 5 days, about 40% in 10 days, and about 70% after two weeks. These results are consistent wtih earlier data discussed and recorded herein.

Tests 24P, 25P, 26P and 27P covering a concentration range of from 5 p.p.m. through 25 p.p.m. gave stability values comparable to those obtained in tests 19P and 23P in which no chelating agent was added (disregarding any possible chelating action of the citric acid in the antioxidant composition used). The conclusion drawn from the results of these tests is that, in the particular system being investigated, a concentration of up to 25 p.p.m. of chelating agent was insufficient to complex or sequester all of the metal ions which exert a catalytic effect on oxidative deterioration of the oils or oleoresins present. And, as long as any appreciable number of these metal ions remain unchelated, they are free to promote the reactions responsible for color loss and rancidity development. While a threshhold value within the range of about 25 p.p.m. to 45 p.p.m. of chelating agent CaNa$_2$ EDTA has been established for the oleoresin paprika-salt system of Table 7, it will be readily understood that for any given preparation involving a particular salt or other carrier, the applicable theory and confirming experiments would dictate that different minima of sequestering agent concentrations would obtain. And in carrier systems involving highly purified salt or using sugar, etc. having minimal concentrations of heavy metals, it is possible that a very low concentration of chelating agent, for example, even less than 10 p.p.m. to 20 p.p.m., based on the carrier concentration, would be sufficient to achieve essentially complete sequestration of the heavy metals present and would be effective to prevent color loss and rancidity development.

The other tests establish that once the requisite minimum of chelating agent necessary to sequester all the heavy metals present has been supplied, no further demonstrable benefits derive from the use of large excesses of reagent. And the stability of preparations containing over 200 p.p.m. of the CaNa₂ EDTA reagent is not significantly greater than for products containing only 45 p.p.m.

TABLE 7

[Effect of sequestering agent concentration on color retention of oleoresin paprika (in presence of an antioxidant)]

| Test No. | Anti-oxidant Composition | CaNa₂EDTA Sequestering or Chelating Agent Concentration, p.p.m. | Color Loss (Percent) | | |
|---|---|---|---|---|---|
| | | | After 5 Days | After 10 Days | After 15 Days |
| 19P | AO-1 | None | 6.5 | 43.5 | 68 |
| 23P | AO-1 | None | 6.0 | 40.0 | 73 |
| 24P | AO-1 | 5 | 5.0 | 43.0 | 69 |
| 25P | AO-1 | 10 | 3.7 | 41.0 | 67 |
| 26P | AO-1 | 15 | 4.3 | 38.0 | 68 |
| 27P | AO-1 | 25 | 4.0 | 38.0 | 67 |
| 20P | AO-1 | 45 | 0.0 | 6.1 | 10.9 |
| 28P | AO-1 | 45 | 0.0 | 5.0 | 11.0 |
| 21P | AO-1 | 135 | 0.0 | 4.8 | 9.1 |
| 22P | AO-1 | 225 | 0.0 | 4.9 | 11.0 |
| 29P | AO-1 | 225 | 0.0 | 4.3 | 10.0 |

While this invention has been described in conjunction with the present preferred embodiments and procedures, it is evident that the invention is not limited thereto. Further modifications of the method and products disclosed herein which fall within the scope of the following claims will be immediately evident to those skilled in this art. To the extent that these changes and modifications are within the scope of the appended claims, they are to be considered a part of this invention.

I claim:

1. The method of stabilizing a spice extractive carried by a particulate, ingestible, solid carrier substance containing a metal constituent which normally catalyzes deterioration of said spice extractive, which method comprises incorporating in said spice extractive an antioxidant, treating said carrier substance with a metal deactivator selected from the group consisting of the edible water-soluble salts of ethylene diamine tetraacetic acid, and combining said spice extractive and said solid carrier, said metal deactivator being present in said carrier substance in an amount effective to complex the metal constituent contained therein and to stabilize said spice extractive against metal-catalyzed deterioration.

2. The method of making a color-stable and rancidity-resistant salt-carried spice concentrate which comprises: treating a spice oleoresin with an edible antioxidant, treating particulate salt with an ingestible metal-complexing agent selected from the group consisting of the edible water-soluble salts of ethylene diamine tetraacetic acid, said agent being effective to deactivate deleterious catalytic effects of trace metals in said salt, and combining said antioxidant-treated oleoresin with said treated salt; whereby the resulting salt-carried oleoresin is color stable and resistant to metal-catalyzed oxidative deterioration.

3. The method of stabilizing a spice extractive carried by a particulate, ingestible, solid carrier material containing a metal constituent which normally catalyzes deterioration of spice extractives and causes loss of color and the production of rancidity in said spice extractive, which method comprises: incorporating an antioxidant in said extractive, treating said solid carrier with a metal deactivator selected from the group consisting of the edible water-soluble salts of ethylene diamine tetraacetic acid, and combining said spice extractive and said solid carrier, said deactivator being present in a small amount but in an amount sufficient to suppress the deleterious catalytic effect of said metal constituent.

4. A particulate, solid, ingestible material carrying a spice extractive, said material containing a trace metal constituent which normally catalyzes deterioration of said spice extractive carried by said material, said spice extractive containing an antioxidant, and said solid ingestible material containing a metal deactivator selected from the group consisting of the edible water-soluble salts of ethylene diamine tetraacetic acid, said deactivator being present in a small but sufficient amount to deactivate the catalytic effect of said metal constituent.

5. In a spice extractive containing an antioxidant and carried by a particulate, solid, ingestible carrier material containing a metal constituent normally effective to catalyze loss of color and development of rancidity in spice extractives, a metal deactivator incorporated in said carrier material, said deactivator being selected from the group consisting of the edible water-soluble salts of ethylene diamine tetraacetic acid, and present in a small amount but in an amount sufficient to suppress the deleterious catalytic effect of said metal constituent.

6. A color-stable and rancidity-resistant oleoresin paprika seasoning product comprising antioxidant-treated oleoresin of paprika carried on a particulate solid water-soluble carrier containing a metal deactivator selected from the group consisting of the edible water-soluble salts of ethylene diamine tetraacetic acid, said metal deactivator being present in an amount effective to stabilize said oleoresin of paprika against decomposition induced by metals and metallic salts.

7. A color-stable and rancidity-resistant oleoresin capsicum seasoning product comprising antioxidant-treated oleoresin of capsicum carried on a particulate solid water-soluble carrier containing a metal deactivator selected from the group consisting of the edible water-soluble salts of ethylene diamine tetraacetic acid, said metal deactivator being present in an amount effective to stabilize said oleoresin of capsicum against decomposition induced by metals and metallic salts.

8. A food seasoning including a spice concentrate comprising: a particulate, solid, ingestible carrier; a spice oleoresin carried on said carrier; an edible anti-oxidant incorporated in said oleoresin; and an ingestible metal-deactivating agent incorporated in said carrier, said metal-deactivating agent being selected from the group consisting of the edible water-soluble salts of ethylene diamine tetraacetic acid, said agent being effective to control deleterious catalytic effects of trace metals and trace metal salts in said carrier, and being present in a concentration effective to prevent said metals and metal salts from promoting color loss and rancidity development in said spice oleoresin.

9. A food seasoning comprising a particulate, solid, ingestible carrier material having therein inherent metal constituents normally effective to catalyze color loss and oxidative rancidity in spice extractives; a metal and metal salt deactivator incorporated in said carrier in a concentration of from about 0.001% to about 0.05% by weight based on the weight of said carrier material and effective to suppress the deleterious catalytic effect of said metal constituents, said deactivator being selected from the group consisting of the edible water-soluble salts of ethylene diamine tetraacetic acid; a spice extractive carried by said carrier material; and, dispersed in said spice extractive, an antioxidant in a concentration of from about 0.001% to about 2.0% by weight based on the weight of said spice extractive.

10. The method of stabilizing a spice extractive carried by a particulate, ingestible, solid carrier substance containing a metal constituent which normally catalyzes deterioration of spice extractives, which method comprises: incorporating an antioxidant in said spice extractive, treating said carrier substance with a metal chelating agent comprising the calcium chelate of the disodium salt of ethylene diamine tetraacetic acid, and combining said spice extractive with said carrier; said metal chelating agent being present in a small but sufficient amount to complex metal otherwise effective to catalyze the deterioration of said spice extractive.

11. In a food seasoning, a spice concentrate comprising a particulate, solid, ingestible carrier material having therein inherent metal constituents normally effective to catalyze color loss and oxidative rancidity in spice extractives; a metal and metal salt deactivator incorporated in said carrier in a concentration of from about 0.001% to about 0.05% by weight based on the weight of said carrier material and effective to suppress the deleterious catalytic effect of said metal constituent, said deactivator being selected from the group consisting of the edible water-soluble salts of ethylene diamine tetraacetic acid; a spice extractive carried by said carrier material; and an antioxidant dispersed throughout said spice extractive.

12. A spice concentrate comprising a particulate, solid, ingestible carrier material having therein inherent metal constituents normally effective to catalyze color loss and oxidative rancidity in spice extractives; and, distributed throughout said carrier, a metal complexing agent selected from the group consisting of the edible water-soluble salts of ethylene diamine tetraacetic acid, and being effective to control and deter the deleterious catalytic effect of the metal constituents; a spice extractive carried by said carrier material; and an antioxidant dispersed throughout said spice extractive.

13. A food seasoning including a spice concentrate comprising a particulate, solid, ingestible carrier material having therein inherent metal constituents normally effective to catalyze color loss and oxidative rancidity in spice extractives; a metal and metal salt deactivator incorporated in said carrier and effective to suppress the deleterious catalytic effect of said metal constituent, said deactivator comprising the calcium chelate of the disodium salt of ethylene diamine tetraacetic acid incorporated in said carrier in a concentration of from about 0.001% to about 0.05% by weight based on the weight of said carrier material and effective to suppress the deleterious catalytic effect of said metal constituents; a spice extractive carried by said carrier material; and, dispersed in said spice extractive, an antioxidant in a concentration of from about 0.001% to about 2.0% by weight based on the weight of said spice extractive.

14. A food seasoning including a spice concentrate comprising a particulate, solid, ingestible carrier material having therein inherent metal constituents normally effective to catalyze color loss and oxidative rancidity in spice extractives; a metal and metal salt deactivator incorporated in said carrier and effective to suppress the deleterious catalytic effect of said metal constituents, said deactivator comprising the calcium chelate of the disodium salt of ethylene diamine tetraacetic acid; a spice extractive carried by said carrier material; and an antioxidant dispersed in said spice extractive.

15. A soluble seasoning comprising a particulate, solid, ingestible carrier material selected from the group consisting of salt and sugar and having therein inherent metal constituents normally effective to catalyze color loss and oxidative rancidity in spice extractives; a metal and metal salt deactivator incorporated in said carrier material and effective to suppress the deleterious catalytic effect of said metal constituents, said deactivator comprising the calcium chelate of the disodium salt of ethylene diamine tetraacetic acid; a spice extractive carried by said carrier material; and an antioxidant dispersed through said spice extractive.

References Cited in the file of this patent

UNITED STATES PATENTS

| | | |
|---|---|---|
| 2,032,612 | Griffith et al. | Mar. 3, 1936 |
| 2,700,612 | Chenicek | Jan. 25, 1955 |
| 2,715,073 | Lowry | Aug. 9, 1955 |
| 2,854,343 | Strashun et al. | Sept. 30, 1958 |

UNITED STATES PATENT OFFICE
CERTIFICATE OF CORRECTION

Patent No. 3,095,306                        June 25, 1963

Maclyn R. Peat

It is hereby certified that error appears in the above numbered patent requiring correction and that the said Letters Patent should read as corrected below.

Column 7, Table 1, second column, line 5 thereof, for "AO-1" read -- AO-2 --; column 9, line 51, for "SA-CaNa$_2$ EDTA" read -- (SA-CaNa$_2$ EDTA --.

Signed and sealed this 14th day of January 1964.

(SEAL)
Attest:
ERNEST W. SWIDER

Attesting Officer

EDWIN L. REYNOLDS

Acting Commissioner of Patents